March 4, 1930.  A. J. MEIER  1,749,436
APPARATUS FOR MAKING PLASTER BOARD
Filed April 16, 1923  2 Sheets-Sheet 2
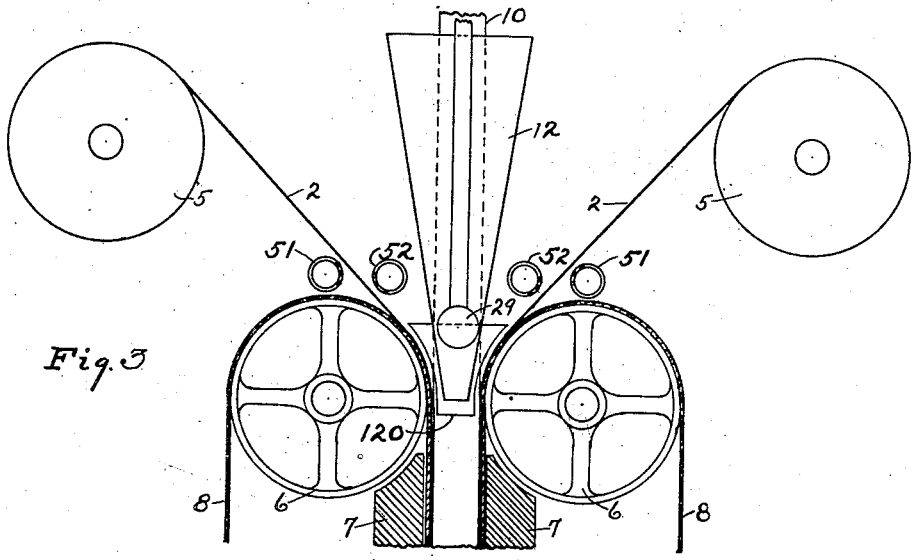
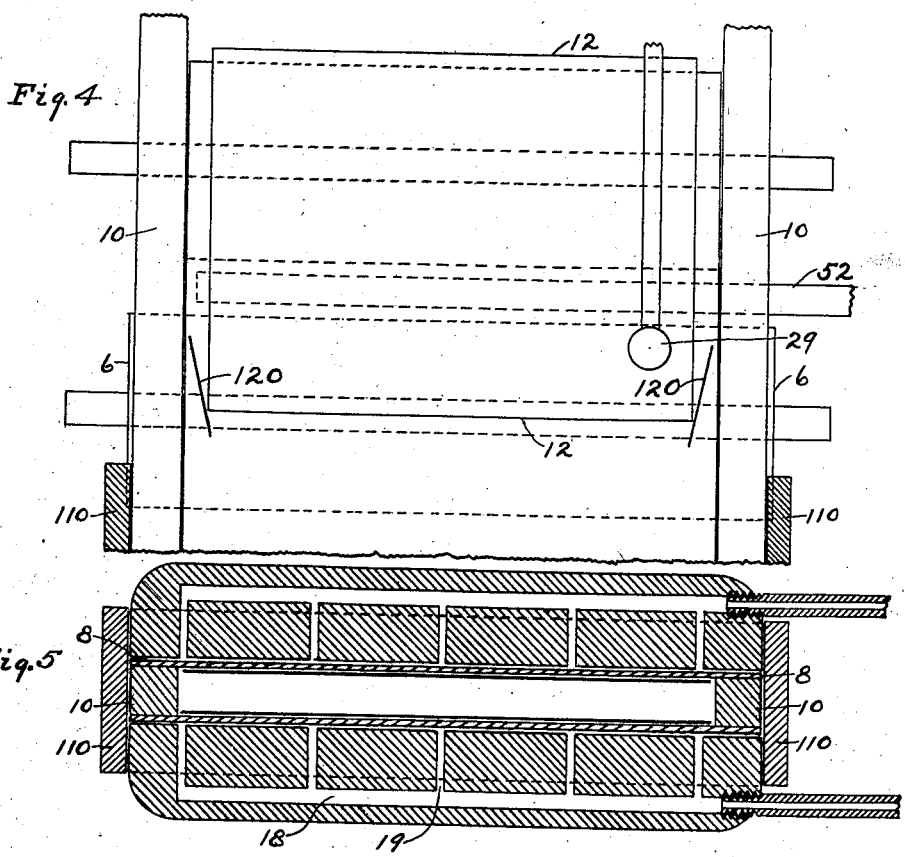
Inventor:
Albert J. Meier
By John N. Bruninga
His Attorney Patented Mar. 4, 1930

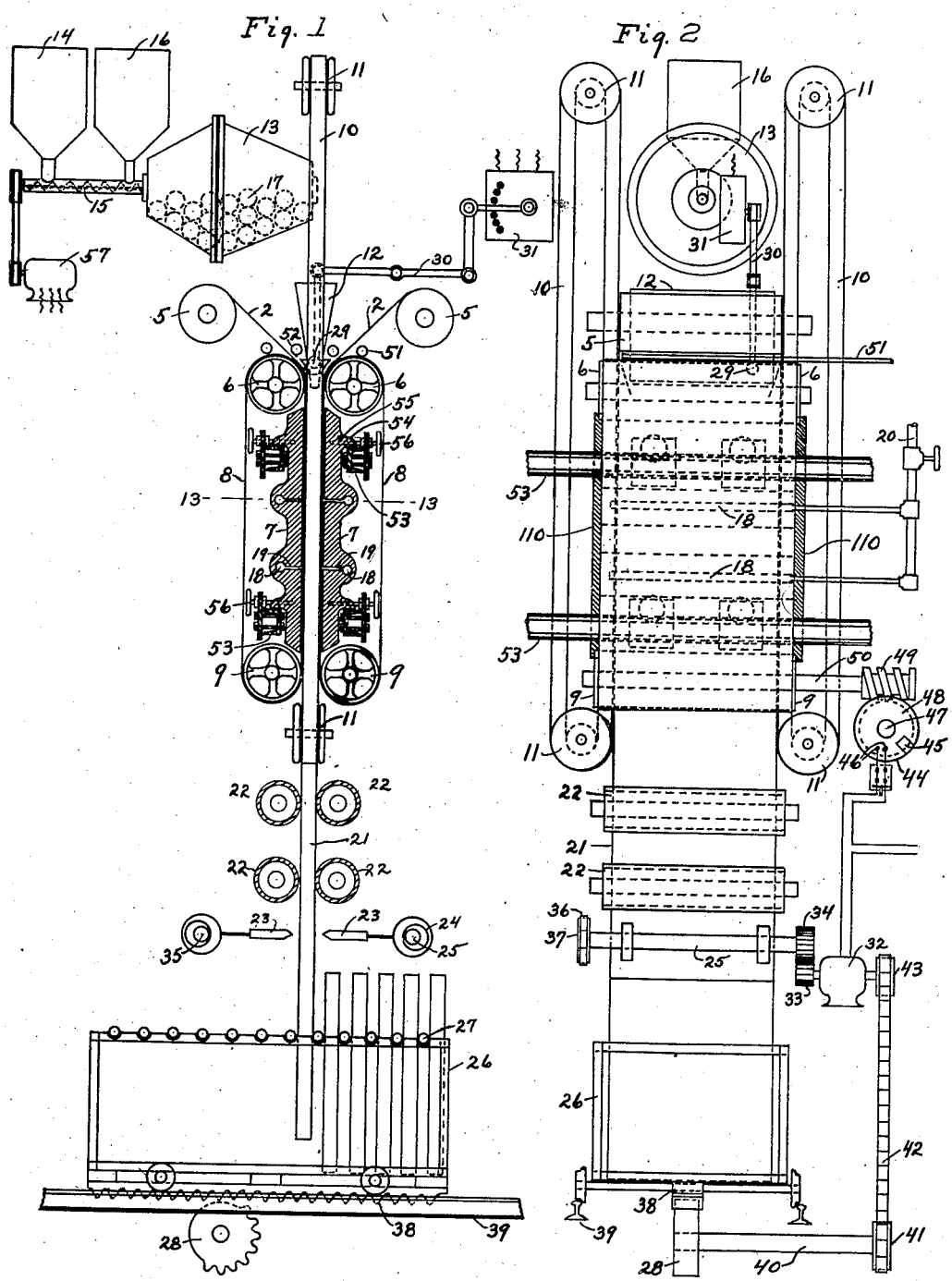

1,749,436

UNITED STATES PATENT OFFICE

ALBERT J. MEIER, OF ST. LOUIS, MISSOURI, ASSIGNOR, BY MESNE ASSIGNMENTS, TO ROCKWOOD CORPORATION OF AMERICA, OF ST. LOUIS, MISSOURI, A CORPORATION OF DELAWARE

APPARATUS FOR MAKING PLASTER BOARD

Application filed April 16, 1923. Serial No. 632,426.

This invention relates to plaster board such as is used for the interior surfacing of walls and to a method and apparatus for making the same.

One of the objects of this invention is to provide a machine for making a plaster board of novel construction which shall be arranged for continuous operation and which will produce plaster board in suitable lengths.

Another object of this invention is to provide a machine which will cast the plaster between downwardly moving facings in a continuous operation.

Another object of this invention is to provide a novel apparatus for carrying out the method in accordance with this invention in a simple and expeditious manner.

Further objects will appear from the detail description taken in connection with the accompanying drawings, in which:

Figure 1 is a vertical sectional view of the apparatus embodying this invention;

Figure 2 is a front elevation of the same;

Figure 3 is an enlarged detail of the head of the apparatus in section;

Figure 4 is a front elevation of Figure 3; and

Figure 5 is a section on line 13—13, Figure 1.

Referring to the accompanying drawings, the finished plaster board comprises a body which may be of any suitable material, such as plaster of Paris. The body is provided with a facing, on one or both sides, of paper, fabric or other suitable material, adapted to protect the surface and to reenforce the board.

In the manufacture of this board the apparatus illustrated in Figures 1 to 5 inclusive may be uesd. These figures are more or less diagrammatic and show the main elements of the apparatus. Many of the structural details have been omitted in order to avoid confusion. The facings 2 are fed from suitable rolls 5 over a pair of drums 6 and downwardly between a pair of supporting plates 7. A pair of wide belts 8 are carried by the drums 6 and a similar pair of lower drums 9 and pass between the plates 7 and the facings 2. These are endless belts and are adapted to be run continuously by rotation of the drums 6 and 9 so as to always keep a portion of the belts 8 between the plates 7 and the facings 2. These belts 8 move with the facings 2 and serve to protect them against any friction or abrasion in their movement over the plates 7. The plates 7 serve to support the belts 8 to keep them flat and thereby support the facings 2 in their downward movement so as to keep them in proper relation to form a perfect board.

A pair of belts 10 substantially square in cross-section and moving over suitable pulleys 11 are arranged to move downwardly between the edges of the belts 8 supported by side plates 110, one on each side, so as to provide dams to prevent the escape of plaster from between the belts 8. These belts 10 may be driven by any suitable source of power (not shown) and move at the same rate of speed as the belts 8 and the facings 2.

Located just over the opening between the facings 2 where they come together at the drum 6 is a hopper 12 adapted to receive the plaster from the mixing drum 13 and feed it into the opening between the facings 2 at their point of approach, and shields 120 being provided to guide the plaster. The mixing drum 13 may be arranged to receive the dry plaster from a suitable bin 14, which may be fed to the drum by a suitable conveyor 15, receiving a proper supply of water from a tank 16, just as it enters the mixing drum. The drum 13 may be supplied with suitable means as, for instance, the balls 17, to insure a thorough pulverizing of the plaster and a thorough mixture with the water. When completely mixed with the water the plaster is discharged at the end of the drum into the funnel 12.

Thus the facings 2 are fed so as to converge at the drums 6 so as to form a funnel, and receive the plaster from the hopper 12. The plaster is poured into the hopper and downwardly therethrough and against and between the facings while the latter are fed downwardly. During their downward movement the facings 2 are supported by the belts 8 and the plates 7. The rate of pouring may be such as to maintain a certain body of plaster always in the funnel so that the plaster upon being delivered to the facings is under a certain hydrostatic head which will help to work the plaster thoroughly into the molding space and to condense the same so as to insure homogeneity of the finished board. The facings and the plaster then move downwardly together, the plaster being somewhat compressed as the facings converge over the rolls 6. During the subsequent movement downward between the plates 7, the plaster gradually begins to set and the apparatus is so timed that the setting is complete by the time the board emerges from between the lower drums 9.

In order to reduce the friction between the belts 8 and the plates 7, the plates are provided with fluid ducts 18 communicating with openings 19 whereby any suitable fluid, such as air or water, may be worked between the belts 8 and the plates 7 so as to provide a film therebetween. This reduces friction and insures a smooth and uniform movement. The fluid may be obtained through a connection 20 to any suitable source of supply.

Upon emerging from the lower drums 9 the finished board 21 may pass between suitable rubber faced guide rolls 22 to any suitable cutting-off device, such as a pair of cutters 23 operated by eccentrics 24 on a pair of shafts 25 operated by a source of power 32 in timed relation with the movement of the belts 8 and 10, so as to cut off regular lengths of the finished plaster board. A suitable container 26 may be arranged below the cutting-off devices 23 so that the finished board when cut off may be delivered directly to the container. This container may be provided with suitable guides 27 for holding the finished boards and may also be provided with a suitable feeding device 28 operated in timed relation with the feed of the board so as to move the container along step by step as the successive boards are delivered to it. In this way the finished plaster board may automatically be stacked in the container as it is finished.

As shown in Figures 1 and 2 the mechanism for controlling the operation of the cutters and of the container or truck 26 comprises the motor 32 which is connected by gears 33 and 34 with the shaft 25 with one of the cutters. The other shaft 35 of the opposite cutter is connected to the shaft 25 by means of chains 36 taking over sprockets 37 on the shafts. Accordingly the cutters are driven in timed relation. The interrupted gear 28 meshing with the rack 38 on the truck which moves on a track 39 has a shaft 40 provided with a sprocket 41 connected by a chain 42 with the sprocket 43 on a motor shaft. The circuit of the motor is controlled by a switch 44 having a contact 45 arranged to cooperate with stationary contacts 46 connected with the motor circuit in order to close the motor circuit. This switch is mounted on a shaft 47 having a worm wheel 48 meshing with a worm 49 on a shaft 50 of one of the rolls 9.

It will, therefore, be seen that during the operation of the machine, the circuit of the motor 32 will be closed at predetermined intervals in timed relation with movements of the plaster so that after a predetermined feed of the plaster sufficient for the desired length, the cutters are operated to sever the plaster and this plaster board then drops into the truck 26. Thereafter the interrupted gear 28 operates to feed the truck along for another space in order to receive the next length of plaster board.

Pipes 51 and 52 are arranged on opposite sides of the facing 2 as delivered from the rolls 5 and these pipes are perforated to deliver sprays of water on each side of the facing in order to place it in proper condition to receive the plaster. In order to provide for different thicknesses of plaster, the guides 7 are arranged for adjustment towards and from each other and for this purpose the guides are adjustably mounted on cross-beams 53 by projections 54 sliding on these cross beams and screws 55 provided for suitable hand-wheels 56 are provided to secure adjustment.

Arranged within the funnel 12 is a float 29 connected by means of any suitable connection 30 with a controlling device 31 whereby the speed of operation of the belts 8 and 10 may be regulated so as to regulate the feed of the facings in accordance with the rate of feed of the plaster. The controlling device 31 comprises a rheostat arranged to control the circuit of an electric motor 57 which operates the feed screw 15. Obviously, as the material level rises in the hopper 12 the float 29 will rise and this will cut into the motor circuit additional resistance so as to reduce the speed thereof; as the material level drops, the resistance will be cut out and the speed of the motor increased. Accordingly the level of the material in the hopper can be maintained constant in order to maintain a constant hydrostatic head.

In accordance with this invention the material used for the manufacture of the plaster board is gypsum in the calcined form which, after being mixed with water, forms a mixture which is arranged to set and form the plaster. This plaster, however, preferably has incorporated therein and with the gypsum a suitable binder, such as bagasse, although other fibrous binders, such as cut rope or wood chips, may be used. In practice where such a binder, such as bagasse, is used, this binder in proportion of 5% to 10% of the total mass and in shredded form and in short lengths in the size of hog's hair is mixed with the water in order to form a thick soupy mixture. This can be accomplished directly in the tank 16. To this mixture is then added the calcined gypsum from the tank 14, the whole being fed into the mixer 13 and hence to the hopper 12.

It will be obvious, of course, that while the apparatus illustrated shows the facings as being fed vertically downward, an exactly vertical position need not necessarily be maintained but a greater or less inclination to the vertical will not effect the operation. It will be seen, therefore, that in accordance with this invention the manufacture of plaster board is carried out in a continuous process in which the facings, supported in a substantial vertical position, are fed downwardly in spaced relation, the facings converging, and the plaster poured against and between the facings at their point of approach and while being fed. The plaster is thus received by the facings at their point of approach and is more or less compressed between the facings as they are fed and then permitted to flow downwardly with them and between the supporting means. A body of plaster is maintained at the point of entrance so as to maintain a hydrostatic head thereon. As the plaster flows downwardly with the facings it takes a set and eventually becomes hard as it passes out from the bottom of the apparatus. It is then cut into suitable lengths and stacked in the container 26 to be properly disposed of.

It is obvious that various changes may be made in details of construction without departing from the spirit of this invention; it is, therefore, to be understood that this invention is not to be limited to the specific details shown and described.

Having thus described the invention, what is claimed is:

1. An apparatus for making plaster board, comprising, means for feeding the facings downwardly, side belts adapted to move with the facings, means extending along said belts for supporting the same against bulging in order to support the facings, and means for pouring the plaster downwardly between the facings so supported.

2. An apparatus for making plaster board, comprising, means for feeding the facings downwardly, side belts adapted to move with the facings, means extending along said belts for supporting the same against bulging in order to support the facings, dams at the edges of said belts, and means for pouring the plaster downwardly between the facings so supported.

3. An apparatus for making plaster board, comprising, means for feeding the facings downwardly, side belts adapted to move with the facings, means extending along said belts for supporting the same against bulging in order to support the facings, dam belts at the edges of said belts, and means for pouring the plaster downwardly between the facings so supported.

4. An apparatus for making plaster board, comprising, means for feeding the facings downwardly, side plates adapted to support the facings, means for pouring the plaster downwardly between the facings so supported, and means at the point of entrance adapted to regulate said feeding means.

5. An apparatus for making plaster board, comprising, means for feeding the facings downwardly, side plates adapted to support the facings, means for pouring the plaster downwardly between the facings so supported, and a float at the point of entrance adapted to regulate said feeding means.

6. An apparatus for making plaster board, comprising, means for feeding the facings downwardly, side plates adapted to support the facings, means for pouring the plaster downwardly between the facings so supported, and a float cooperating with said body of plaster at a point of entrance adapted to regulate said feeding means.

7. An apparatus for making plaster board, comprising, means for feeding the facings downwardly in spaced relation, means for pouring the plaster downwardly between the facings, a belt adapted to move with the facing, a plate adapted to support said belt, and means for forming a film of fluid between said belt and said plate.

8. An apparatus for making plaster board, comprising, means for feeding the facings downwardly in spaced relation, means for pouring the plaster downwardly between the facings, a belt adapted to move with the facing, and a plate adapted to support said belt, and having fluid openings adapted to provide a film of fluid between said belt and said plate.

9. An apparatus for making plaster board, comprising, means for bringing the facings together, means for pouring the plaster downwardly between the facings, and a spray adapted to play upon the facings at their point of approach.

10. An apparatus for making plaster board, comprising, means for feeding the facings downwardly, side belts adapted to move with the facings, dams at the edges of said belts and moving therewith, supporting plates extending along said belts and said dams adapted to support the same against bulging until the plaster has set, and means for pouring the plaster downwardly between the facings.

11. An apparatus for making plaster board, comprising, means for feeding the facings downwardly, side belts adapted to move with the facings, dams at the edges of said belts and moving therewith, supporting plates extending along said belts and said dams adapted to support the same against bulging until the plaster has set, means for pouring the plaster downwardly between the facings, and means for lubricating said belts.

In testimony whereof I affix my signature this 11th day of April, 1923.

ALBERT J. MEIER.